United States Patent
Barrera et al.

(10) Patent No.: US 6,792,673 B2
(45) Date of Patent: Sep. 21, 2004

(54) APPARATUS FOR FORMING A HOLLOW CYLINDRICAL DYNAMO-ELECTRIC MACHINE STATOR CORE

(75) Inventors: Giorgio Barrera, Turin (IT);
Gianfranco Stratico, Siena (IT);
Andrea Bonnacorsi, Turin (IT);
Sandro Lombardi, Turin (IT)

(73) Assignee: Axis USA Inc., Tampa, FL (US)

( * ) Notice: Subject to any disclaimer, the term of this patent is extended or adjusted under 35 U.S.C. 154(b) by 67 days.

(21) Appl. No.: 10/237,529

(22) Filed: Sep. 6, 2002

(65) Prior Publication Data

US 2003/0005580 A1 Jan. 9, 2003

Related U.S. Application Data

(63) Continuation of application No. 09/450,837, filed on Nov. 29, 1999, now abandoned.
(60) Provisional application No. 60/110,994, filed on Dec. 4, 1998, and provisional application No. 60/133,169, filed on May 7, 1999.

(51) Int. Cl.$^7$ ............................ H02K 15/00; H23P 19/00
(52) U.S. Cl. ............................ 29/732; 29/598; 29/609; 29/735; 310/259
(58) Field of Search ................... 29/596, 598, 605, 29/606, 609, 729, 732, 733, 735, 738, 779; 310/42, 43, 216, 254, 259

(56) References Cited

U.S. PATENT DOCUMENTS

| | | | |
|---|---|---|---|
| 3,202,851 A | 8/1965 | Zimmerle et al. | 310/259 |
| 3,283,399 A | 11/1966 | Hart et al. | 29/155.57 |
| 3,581,389 A | 6/1971 | Mori et al. | 29/598 |
| 3,886,256 A | 5/1975 | Ohuchi et al. | 310/216 |
| 4,102,040 A | 7/1978 | Rich | 29/598 |
| 4,206,624 A | 6/1980 | Asai et al. | 72/131 |
| 4,211,944 A | 7/1980 | Haller | 310/72 |
| 4,211,957 A | 7/1980 | Alley et al. | 315/276 |
| 4,221,944 A | 9/1980 | Jährig et al. | 200/303 |
| 4,395,815 A | 8/1983 | Stanley et al. | 29/598 |
| 4,445,353 A | * 5/1984 | Taleff et al. | 72/136 |
| 4,512,376 A | 4/1985 | Barrera | 140/92.1 |
| 4,909,057 A | * 3/1990 | Fritzsche | 72/131 |
| 5,050,295 A | 9/1991 | Ballard et al. | 29/609 |
| 5,265,320 A | 11/1993 | Greenway | 29/596 |
| 5,584,163 A | 12/1996 | Storandt | 53/410 |
| 5,604,678 A | * 2/1997 | Neuenschwander | 29/596 |
| 5,819,575 A | 10/1998 | Kobasyashi et al. | 72/187 |
| 5,827,166 A | 10/1998 | Cestonaro et al. | 493/344 |
| 5,845,392 A | 12/1998 | Cardini et al. | 29/736 |
| 6,147,431 A | * 11/2000 | Asao et al. | 29/596 |

FOREIGN PATENT DOCUMENTS

| | | |
|---|---|---|
| DE | 2621377 A1 | 12/1976 |
| DE | 19756575 A1 | 1/1999 |
| JP | 02231943 A | 9/1990 |
| JP | 08163835 | 6/1996 |
| JP | 09163642 A | 6/1997 |
| JP | 11299136 | 10/1999 |

\* cited by examiner

*Primary Examiner*—Peter Vo
*Assistant Examiner*—Donghai Nguyen
(74) *Attorney, Agent, or Firm*—Fish & Neave; Robert R. Jackson; James A. Leiz (57) ABSTRACT

Hollow cylindrical dynamo-electric machine stator cores may be made by superimposing at least two strips of core material to produce a composite strip. One or more of the strips may be run through a pressure roller structure prior to super-positioning of the strips. The composite strip is coiled helically to produce the hollow cylindrical stator core. By pressure rolling at least one strip, the internal diameter of the stator core can be adjusted to reduce irregularities. By superimposing strips prior to coiling, thinner strips can be used without requiring the stator forming machine to operate longer or faster to produce stator cores of a given size. The pressure rolling aspects of the invention are also applicable to coiling apparatus that uses only a single strip. Stator cores may also be made by coaxially assembling and joining two coils with a hollow annular lamination disposed between the two axially spaced coils.

12 Claims, 12 Drawing Sheets

APPARATUS FOR FORMING A HOLLOW CYLINDRICAL DYNAMO-ELECTRIC MACHINE STATOR CORE

This is a continuation of U.S. patent application Ser. No. 09/450,837, filed Nov. 29, 1999, now abandoned, which claims the benefit of U.S. provisional patent application No. 60/110,994, filed Dec. 4, 1998 and U.S. provisional patent application No. 60/133,169, filed May 7, 1999, which are hereby incorporated by reference herein in their entireties.

BACKGROUND OF THE INVENTION

This invention relates to methods and apparatus for forming dynamo-electric machine stators of the type that are made by helically coiling a longitudinal strip of ferromagnetic material.

Barrera U.S. Pat. No. 4,512,376 and Cardini et al. U.S. Pat. No. 5,845,392 (both of which are hereby incorporated by reference herein in their entireties) show apparatus for applying coils of wire to stator cores to produce stators that are particularly useful for making alternators. It is known to produce this type of stator core by helically coiling a strip of ferro-magnetic material to produce a hollow cylinder. The strip is provided with transverse recesses spaced from one another along one of the strip's longitudinal edges. The spacing of the recesses and the helical coiling are such that recesses in successive turns of the coil become superimposed on one another. In this way the superimposed recesses produce slots in the stator core that extend parallel to the longitudinal axis of the hollow cylinder and that are spaced from one another in the circumferential direction around the inside of the hollow cylinder. These slots receive the coils of wire that were mentioned earlier.

The electrical efficiency and thus performance of stators of a given size of the type described above can be improved by making them from thinner strip material. However, to make a stator core of a given size from thinner material either takes longer or requires the stator core forming machinery to operate faster, both of which are undesirable. For example, to make a stator forming machine operate faster increases its cost and may also increase the rate of wear of the machine. More machine cycles may be required to produce stators of a given size using thinner strip material, and therefore the number of stator cores that can be produced during the useful life of a machine may decrease when thinner strip material is used.

It is also known that the strip material used to produce the stator cores can have variations in thickness, metallurgical and mechanical properties, and geometrical configuration. These variations can lead to undesirable variations in the diameter of the internal surface of the helical stator core. Variations in the internal surface affect the performance of the helical stator core. These variations in the strip material can occur between reels of strip material and throughout a reel of strip material. There are also local variations or deformations that can occur at particular isolated points on the strip material. It has been found that these local variations can disrupt the electromagnetic flow within fabricated stator cores and thus hinder the performance of the stators.

Stator cores can also be made by combining two helically formed strips from separate stator forming machines each using a different reel of strip material. Additional advantages can be achieved by combining the two helically formed strips with an additional lamination inserted between the two helically formed strips. The two helically formed strips and lamination are combined by aligning their longitudinal axes and the recesses of each piece. Differences in the internal diameter of the two helically formed strips are not desirable.

Strip material that is helically coiled undergoes deformation. Depending on the dimensions and properties of the strip material, additional unwanted deformations may occur. One factor which affects the occurrence of unwanted deformations is the thickness of the strip material. Typically, the thinner the strip material, the more likely unwanted deformations will occur.

In view of the foregoing, it is an object of this invention to provide improved methods and apparatus for making dynamo-electric machine stator cores.

It is a more particular object of this invention to provide methods and apparatus for making stator cores from thinner strip material, which methods and apparatus avoid the need to operate the stator forming machinery either longer or faster to produce stator cores of a given size.

It is also an object of this invention to provide methods and apparatus for reducing the effect of variations that can occur in the strip material on the electrical performance of the stator cores. More specifically, the performance can be increased by reducing the variations that can occur in the internal diameter of stator cores and by reducing the effects of local variations that may be present in the strip material.

It is another object of this invention to provide methods and apparatus for reducing unwanted deformations that can occur when strip material is coiled.

SUMMARY OF THE INVENTION

These and other objects of the invention are accomplished in accordance with the principles of the invention by providing methods and apparatus in which, in at least some embodiments, two relatively thin strips of stator core material are superimposed on one another to form a composite strip before the composite strip is helically coiled to produce the hollow cylinder of the stator core. In this way each strip can be half as thick as the single strip used previously, but the machinery can operate at the same speed to produce finished stator cores of a given size at the same rate as the prior art machinery.

The methods and apparatus of at least some embodiments of the invention typically include superimposing the two strips so that recesses in those strips are superimposed on one another to produce recesses in the composite strip. The composite strip is coiled so that recesses in successive turns of the coil are superimposed on one another to produce slots for receiving wire coils as in prior art stators. The methods and apparatus of the invention may include shaping (e.g., punching) each of the strips to produce the above-mentioned recesses. The methods and apparatus of the invention may also include periodically severing the coil from the composite strip to produce end faces of the stator cores. The methods and apparatus of the invention may still further include axially compressing the coils (e.g., to square off the ends of the stator core) and welding the compressed coils together to rigidify the structure. The methods and apparatus of the invention may also include selectively pressure rolling the strips in order to achieve a more constant internal diameter of the stator core. The internal diameter of the stator core can also be measured in order to provide feedback to adjust the pressure rolling.

Another aspect of at least some embodiments of the invention includes applying the principles of selective pressure rolling to alternative methods and apparatus for forming dynamo-electric machine stator cores in which the stator cores are fabricated by combining two helically formed strips from separate stator forming machines that include selectively pressure rolling the strips.

An additional aspect of at least some embodiments of the invention includes coiling strip material that contains apertures within the strip to reduce unwanted deformations.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
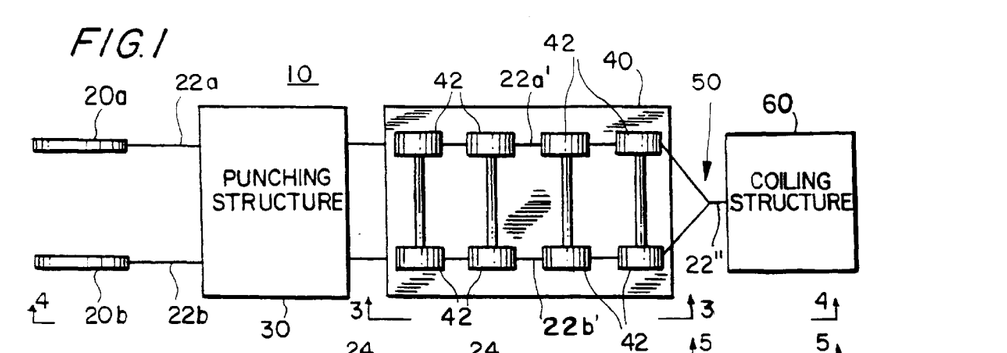
FIG. 1 is a simplified plan view of an illustrative embodiment of apparatus constructed in accordance with certain aspects of the invention.
Figure 4:
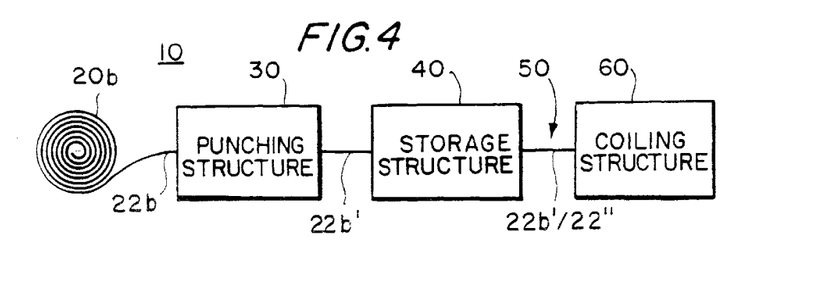
FIG. 4 is a simplified elevational view taken along the line 4—4 in FIG. 1.

Illustrative apparatus 10 constructed in accordance with certain aspects of the invention is shown in simplified plan view in FIG. 1 and in simplified elevation in FIG. 4. Apparatus 10 includes two reels 20a and 20b of strip material 22a and 22b, respectively. Strip material 22a and 22b may be thinner than the single strip of such material typically used in prior art stator core coiling apparatus. For example, each strip 22a and 22b may be approximately only half as thick as the strip material conventionally used.

Figure 2:
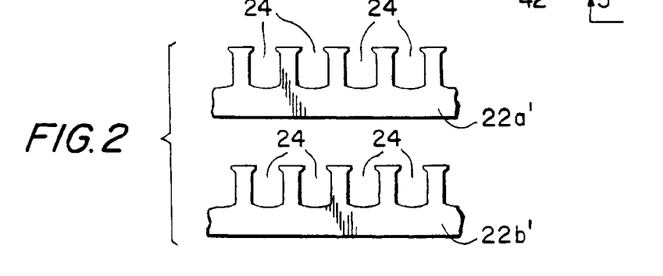
FIG. 2 is a simplified plan view of an illustrative embodiment of representative strip material produced in the FIG. 1 apparatus.

Strips 22a and 22b are fed side by side to punching structure 30 at the same rate. Punching structure or punch 30 punches transverse recesses 24 in one longitudinal edge of each strip 22 at regular intervals along the length of that strip as shown in FIG. 2. To distinguish the punched strips from the unpunched strips, the punched strips are referenced 22a' and 22b' herein.

Figure 3:
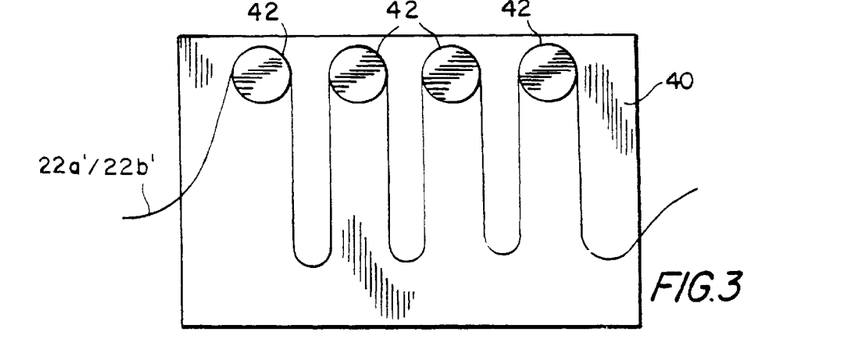
FIG. 3 is a simplified elevational view taken along the line 3—3 in FIG. 1.

The punched strips 22a' and 22b' exiting from punch 30 enter strip storage mechanism or structure 40. This mechanism forms a plurality of loops in each strip 22' over pulley wheels 42 as shown in FIG. 3 so that the strips can enter the storage mechanism at a rate that may sometimes differ from the rate at which the strips leave that mechanism. For example, the output of strips 22' from mechanism 40 may occasionally be halted for certain downstream operations without the need to similarly halt the operation of punch 30. Mechanism 40 may automatically accommodate such differences in input and output rates by changing the length of the strip loops in the mechanism. Of course, if all the loops reach a predetermined maximum length, then mechanism 40 must stop further input from punch 30 because no more strip material can be accommodated in mechanism 40. Similarly, if all of the loops in mechanism 40 reach a predetermined minimum length, then mechanism 40 must stop the downstream machinery until the supply of strip material in mechanism 40 is replenished. In the same way that punch 30 processes both strips 22a and 22b at the same rate, mechanism 40 preferably also handles strips 22a' and 22b' identically in order to help maintain synchronism between the two strips. This can be done by connecting the corresponding pulley wheels 42 for respective strips 22' to the same drive shaft as shown in FIG. 1. The length of the loops of strip material 22a' and 22b' between successive pulley wheels 42 can then be varied together by adjusting the rate of rotation between the successive pulley wheels 42 that are connected to respective shafts.

Figures 5, 6:
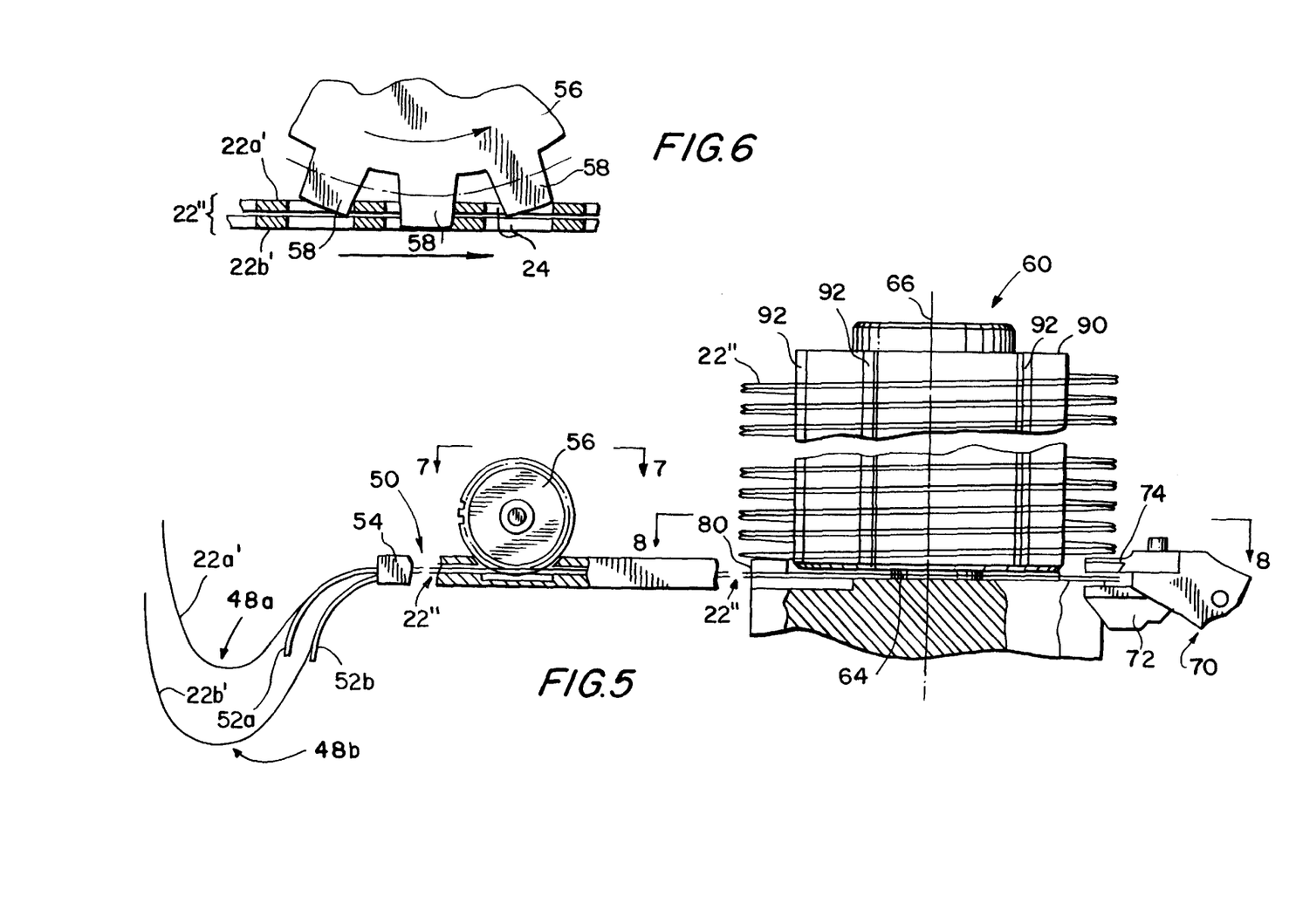
FIG. 5 is a more detailed elevational view, partly in section, taken generally along the line 5—5 in FIG. 1.
FIG. 6 is an enlargement, partly in section, of a portion of FIG. 5.
Figure 7:
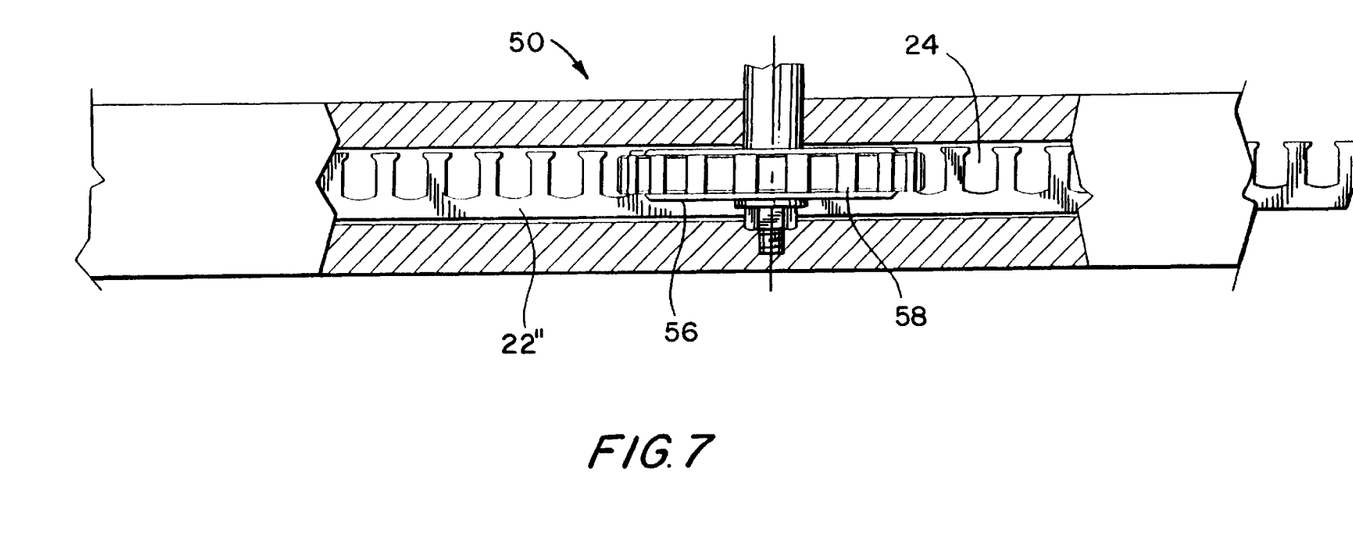
FIG. 7 is a plan view, partly in section, taken generally along the line 7—7 in FIG. 5.

After strips 22a' and 22b' exit from mechanism 40, they may be given slack before entering superposition mechanism or structure 50. This causes strips 22a' and 22b' to form respective loops 48a and 48b before they are brought together and superimposed on one another by super-position mechanism 50 as shown in FIGS. 1, 4, and 5. For example, super-position mechanism 50 may include various passive guide structures 52a, 52b, and 54 for aligning strip 22a' over strip 22b' and an active element (i.e., driven spur gear 56) for pulling both of strips 22a' and 22b' through guide structures 52 and 54. Passive guide structure 52a and 52b support loops 48a and 48b and direct strips 22a' and 22b' together into passive guide 54. As is shown in FIGS. 5–7, teeth 58 on spur gear 56 extend into superimposed recesses 24 in strips 22a' and 22b' in order to maintain precise super-positon of strips 22a' and 22b' and their recesses. The relative adjustment that may occur between strips 22a' and 22b' in order to maintain precise super-position of their recesses is taken into account by the slack present in loops 48a and 48b. For convenience herein superimposed strips 22a' and 22b' are sometimes referred to collectively as composite strip 22". Although FIGS. 5 and 6 continue to show some vertical spacing between the components 22a' and 22b' in composite strip 22", it will be understood that the components of strip 22" may in fact be in contact with one another.

Figure 8:
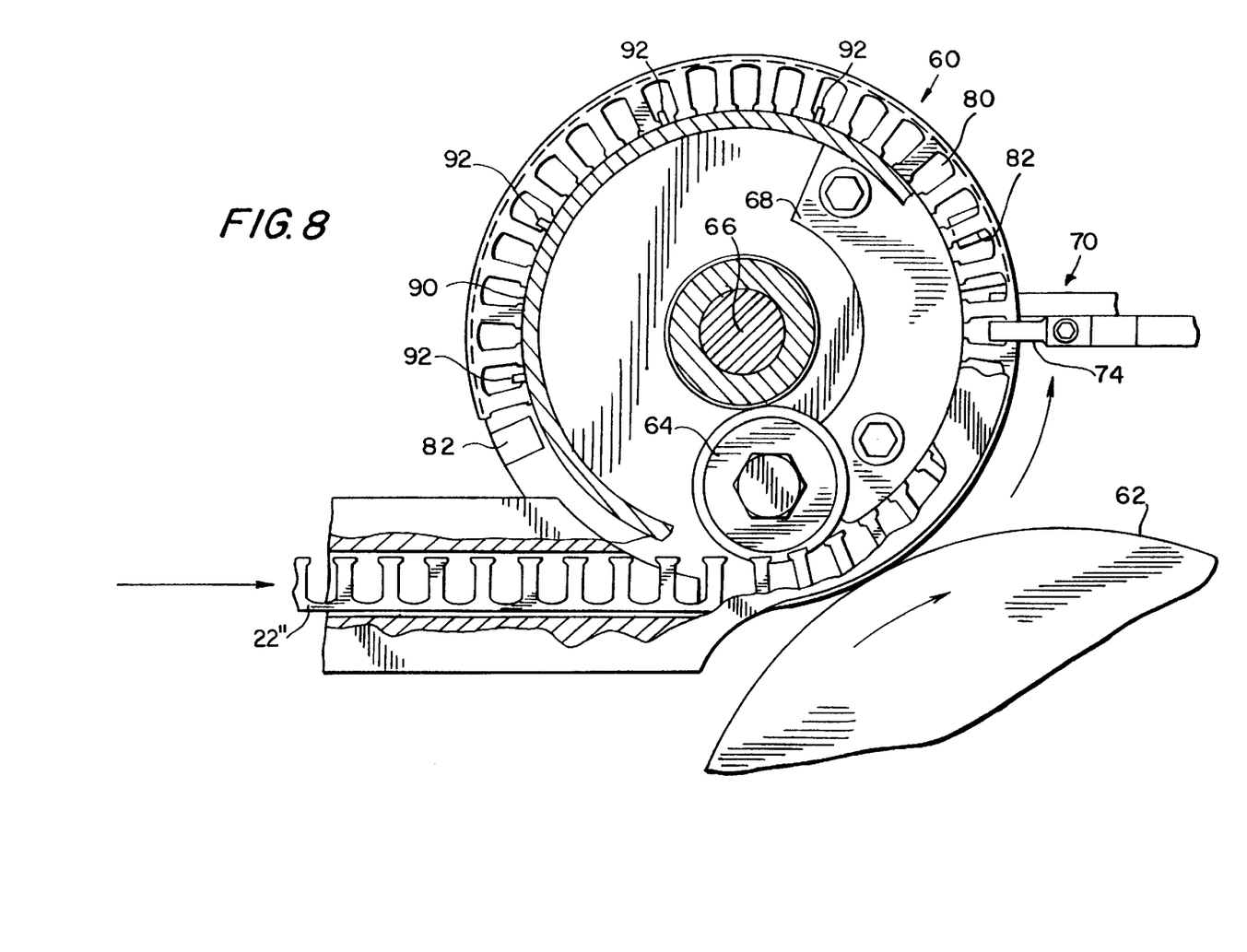
FIG. 8 is a plan view, partly in section, taken generally along the line 8—8 in FIG. 5.

From super-position mechanism 50, composite strip 22" is supplied to coiling mechanism 60 as shown in detail in FIGS. 5 and 8. In particular, composite strip 22" enters the lower portion of mechanism 60 and first passes through the clearance between rollers 62 and 64. Rollers 62 and 64 are set relative to one another, relative to composite strip 22", and relative to the central vertical axis 66 of coiling mechanism 60 so that they bend strip 22" into approximate concentricity with axis 66. In particular, rollers 62 and 64 preferably cooperate with one another to give strip 22" a curvature having a radius slightly less than the desired radius of the finished stator to be made from strip 22". This helps hold strip 22" against other components of coiling mechanism 60. For example, it helps hold composite strip 22", against stationary arcuate guide 68, which is inside the arc of composite strip 22" downstream from rollers 62 and 64. Farther downstream it helps hold composite strip 22" against the outer surface of rotating drum 90, which is described in more detail later in this specification.

After passing between rollers 62 and 64, composite strip 22" passes between the blade 72 and anvil 74 of cutting mechanism or severing structure 70. Cutting mechanism 70 is used to sever or cut strip 22" after enough of the strip has passed through the cutter to form a stator of the desired cylindrical length.

After passing through cutter 70, composite strip 22" starts up stationary helical ramp 80. Ramp 80 gradually raises strip 22" into contact with the lower portion of rotating drum 90. This is necessary because drum 90 is above roller 64, and so strip 22" must be raised to the level of drum 90 before it completes its first wrap or loop around axis 66. Drum 90 is driven to rotate about axis 66 in the same direction that strip 22" is moving and with an outer surface velocity equal to the velocity of strip 22". The outer surface of drum 90 has radially outwardly extending teeth 92 that are spaced to enter at least some of the recesses 24 in strip 22" in order to help keep the recesses in successive turns of strip 22" on drum 90 superimposed on one another and to help drum 90 pull strip 22" into the coiling mechanism. The outer surface of drum 90 has the same radius as the inner radius of the stators being made by the apparatus.

As additional strip material 22" is supplied to drum 90, previous turns of the strip material are forced to move up along the outer surface of the drum. Accordingly, a helix of strip material 22" gradually builds up on drum 90 as shown in FIG. 5. Although FIG. 5 shows space between successive turns in this helix, it will be understood that in actual practice the successive turns are typically in contact with one another.

When sufficient strip material 22", has passed through cutter 70 to produce a stator of the desired cylindrical length, cutter 70 is operated to cut through strip 22". The accumulated strip material downstream from the cutter is then lifted up off the top of drum 90. Apertures 82 may be provided in ramp 80 to allow a lifting mechanism (not shown) to engage the under side of the helix on drum 90.

Figure 9:
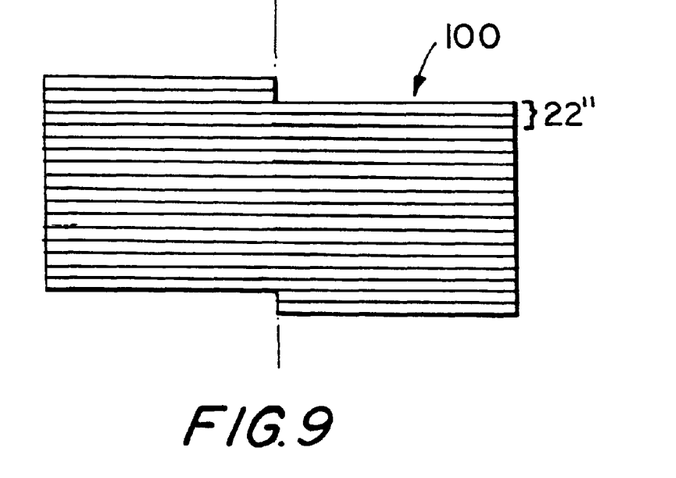
FIG. 9 is an elevational view of an illustrative stator core assembly made in accordance with certain aspects of the invention.
Figure 10:
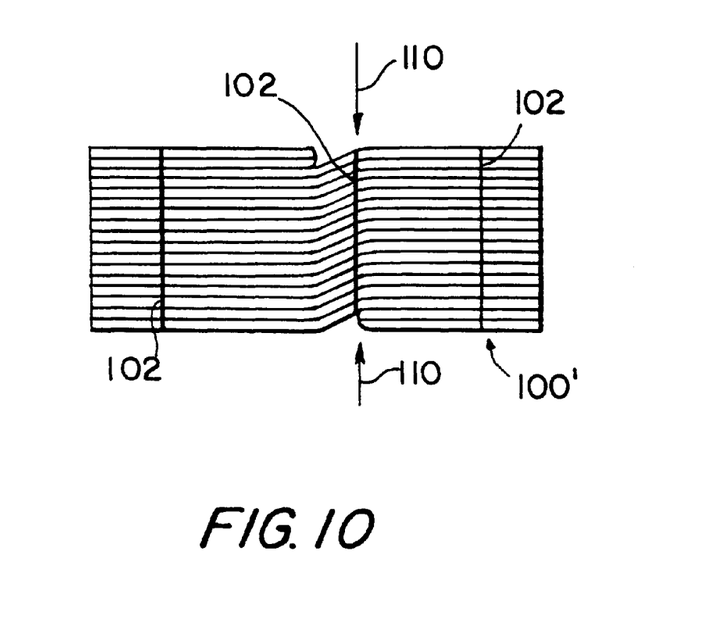
FIG. 10 is an elevational view of the FIG. 9 stator core assembly after further processing in accordance with certain aspects of the invention.

FIG. 9 shows a typical helix 100 of strip material 221" after removal from coiling apparatus 60. A subsequent step in the manufacture of stator cores in accordance with this invention is to axially compress helix 100 as shown by arrows 110 in FIG. 10. This helps make the axial ends of the tubular stator core more square (i.e., perpendicular) to the central longitudinal axis of the stator. In addition to squaring off the axial ends of the helix, the several turns of strip material in the helix may be welded together (e.g., along lines 102) to convert the helix to a rigid, unitary structure 100' usable as a stator core.

It will be apparent from the foregoing discussion of the manner in which stator core 100' is made that recesses 24 in adjacent turns of the helix of material 22" are aligned with one another along the entire axial length of the stator. These aligned recesses therefore produce the longitudinal slots in the interior surface of the stator core that are used to receive the coils of wire required to complete the stator in the conventional manner. In order to ensure such alignment of the recesses 24 in adjacent turns of the helix of material 221", the outer circumference of drum 90 must be an integer multiple of the spacing between adjacent recesses 24 in the strip material.

It will be understood that the foregoing is only illustrative of certain aspects of the invention, and that various modifications can be made by those skilled in the art without departing from the scope and spirit of the invention. For example, although only two strips 22a and 22b are processed and superimposed to produce composite strip 22" in the embodiment shown and described herein, it will be understood that more than two strips can be superimposed to produce composite strip 22" if desired. As another example of modifications within the scope of the invention, side-by-side handling of strips 22a/22a' and 22b/22b' is shown herein and may have the advantage of simplifying storage mechanism 40. But strips 22a/22a' and 22b/22b' could be supplied with different positions relative to one another (e.g., one above the other) if desired. It may not be necessary in all cases for the apparatus to include all of the components that have been shown and described herein. For example, coils 20a and 20b could be of prepunched strip material, thereby rendering punch 30 unnecessary. Storage mechanism 40 is also optional and can be eliminated if there is no need to adjust production rates between upstream and downstream components.

Figures 12, 13:
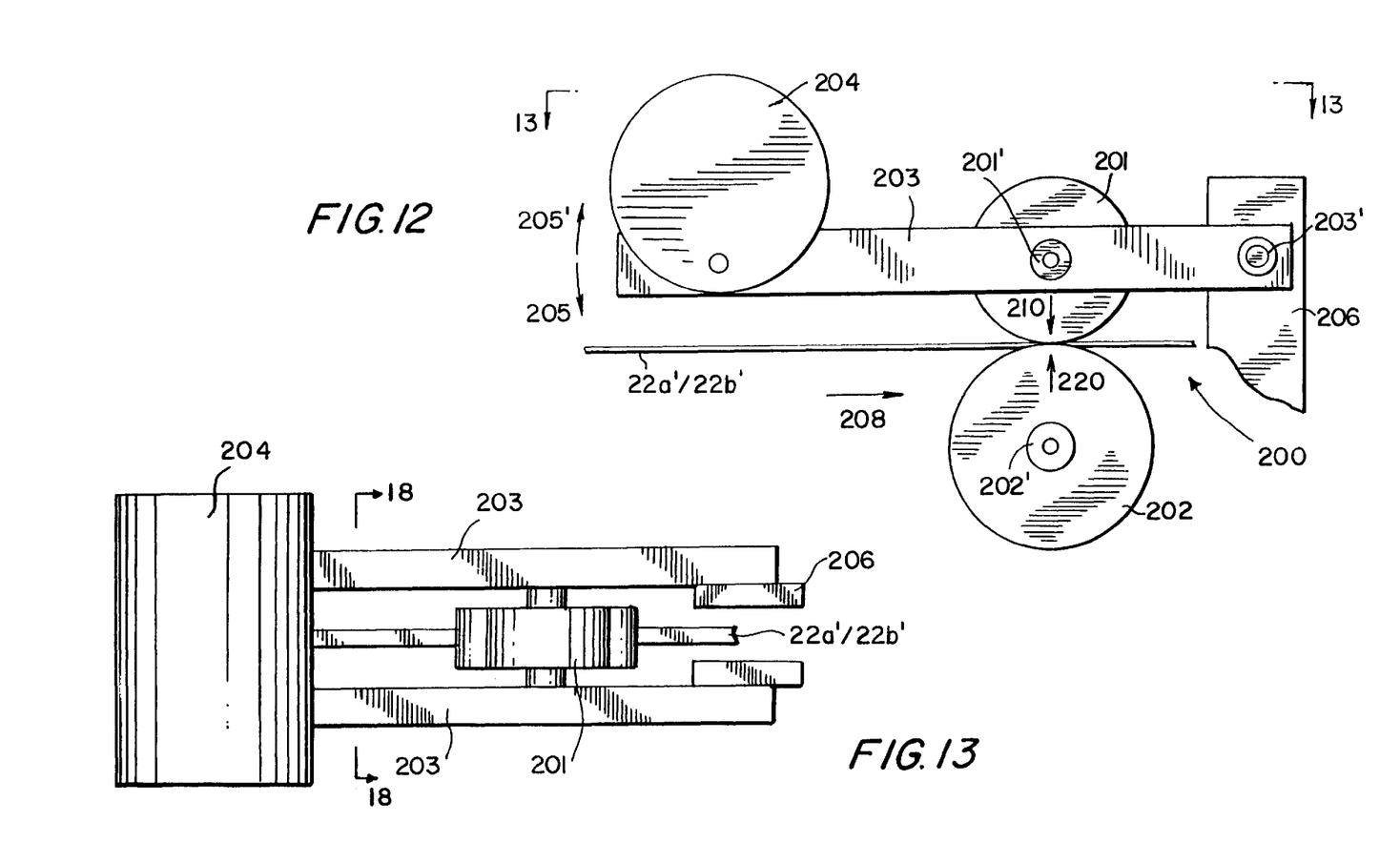
FIG. 12 is a simplified elevational view of an illustrative embodiment of a pressure device in accordance with certain aspects of the invention.
FIG. 13 is a plan view taken generally along line 13—13 of FIG. 12.

Furthermore, pressure device or structure 200 as shown in elevation view in FIG. 12 and in plan view in FIG. 13 may be included in apparatus 10 as an additional feature of the invention. Preferably, two pressure devices 200 would be included in apparatus 10, each located between storage mechanism 40 and super-position mechanism 50 and each associated with a respective one of strips 22a' and 22b'.

Pressure device 200 compresses strip 22a' or 22b' between top roller 201 and bottom roller 202 as the strip passes through the device in direction 208. Top roller 201 is free to rotate about shaft 201' which is mounted between two arms of lever 203. Lever 203 is pivotably attached to support 206 by pin 203' and is therefore pivotable in directions 205 and 205I. Top roller 201 presses downward with a force F in direction 210 onto the upper surface of strip 22a' or 22b' and bottom roller 202 reacts with an equal and opposite force F upward in direction 220 onto the bottom surface of strip 22a' or 22b'. The bottom roller 202 is free to rotate about shaft 202' which is mounted on a support structure (not shown). Adjustable weight 204 is mounted on the section of lever 203 which extends out beyond top roller 201 opposite from pin 203'. Weight 204 is adjustable in its position on lever 203 and in its weight. By adjusting these two factors, the force exerted on strip 22a' or 22b' can be changed.

More particularly, as each strip 22a' or 22b' exits from storage device 40, each strip will enter a separate pressure device 200. The strips 22a' and 22b' will pass between pressure rollers 201 and 202 and experience a pressure P on their respective top and bottom surfaces in contact with pressure rollers 201 and 202. Pressure P results from the force F exerted from pressure rollers 201 and 202 to strips 22a' and 22b'. After exiting from pressure rollers 201 and 202, strips 22a' and 22b' are brought together and superimposed by super-position mechanism 50. While the strips are actively driven through pressure devices 200 from further downstream, an active element may be associated with each pressure device 200. For example, pressure rollers 201 and 202 may be actively driven or an additional active spur gear similar to spur gear 56, designed for a single strip, may be used to help pull the strips through pressure rollers 201 and 202.

Figure 11:
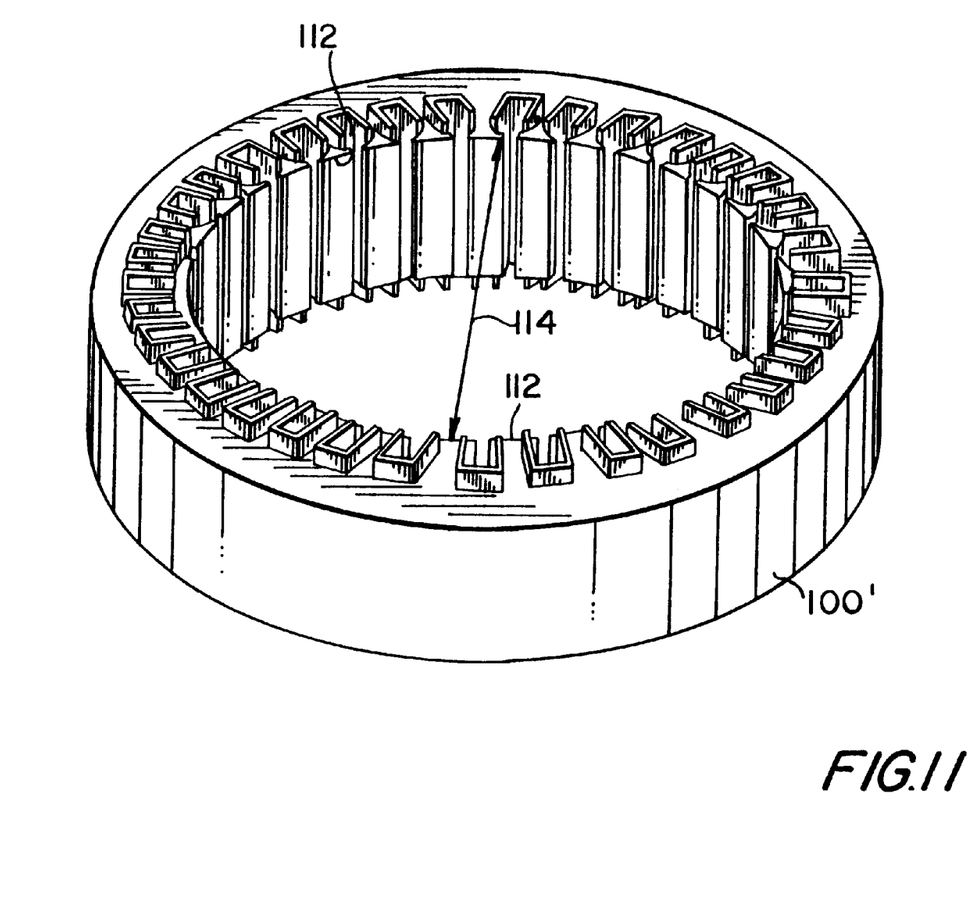
FIG. 11 is a perspective view of an illustrative stator core assembly made in accordance with the invention.

The variations that can exist in the strip material and the other various processes that the strips undergo can cause spur gear 56 to feed different lengths of the strip material to drum 90. Even if spur gear 56 maintains precise alignment of the recesses 24 in strips 22a' and 22b' of composite strip 22", variations in internal diameter 114 can still occur. The internal diameter 114 is shown in FIG. 11 as the distance between diametrically opposite pole extensions 112. (FIG. 11 shows stator core 100' after the slots produced by axially aligned recesses 24 have been lined with insulating material, but that insulating material can be ignored for purposes of the present invention.) For example, if the spacing of the recesses 24 in strips 22a' and 22b' is not the same, more material will be fed to drum 90 from the strip with the larger recess spacing. Since drum 90 pulls the strips around with teeth 92 entering at least some of the recesses 24, the strip with larger recess spacing will need to fit more material between adjacent teeth 92 than the other strip. This causes the longer strip to spread radially out from drum 90 in order for the additional material to fit in the same arc length around drum 90. This results in a corrugated internal diameter of stator core 100', wherein each adjacent strip layer in stator core 100' will alternate between a larger and smaller internal diameter. Other defects, deviations, or irregularities in the thickness, recess spacing, or other properties of one or both strips can produce other similar imperfections in the internal diameter 114 of a stator core.

By measuring the internal diameter 114 in stator core 100' and comparing these values to a nominal value, an adjustment of the weight 204 in the pressure device 200 for each strip 22a' and 22b' can be determined. As each weight 204 is moved farther out on the associated lever 203 or its weight increased, pressure P increases on the respective strip. This increase in pressure further compresses the strip as it moves through pressure device 200 and thus decreases its thickness and elongates its length. Hence, the internal diameter 114 of stator core 100' for that strip will increase. Therefore, if the internal diameter of stator core 100' for a particular strip is too small, the pressure P should be increased for that particular strip. Likewise, if the internal diameter of stator core 100' for a particular strip is too big, the pressure P should be decreased for that particular strip. Similarly, both weights 204 may need to be adjusted if the internal diameter of the stator core as a whole is too large or too small. Therefore, through this method, variations in the internal diameter 114 of stator core 100' can be reduced and possibly eliminated. For this setup, the appropriate weight 204 is typically adjusted between reels of strip material and also between fabricated stator cores. An additional benefit of pressure rolling device 200 is the flattening of certain types of local variations that may occur on the strip material.

The adjustment of the weight 204 in each pressure device 200 may be done manually by an operator of apparatus 10 or it can be done automatically. In pressure device 200 as described above, the weight 204 may be moved by a motor drive (not shown) connected between weight 204 and lever 203 which can vary the position of weight 204 on lever 203. The automatic positioning of weight 204 can be determined by measuring the internal diameter of strips 22a' and 22b' in stator core 100' (or the internal diameter of stator core 100' as a whole) and feeding this information along with the nominal internal diameter to a control unit (not shown) that controls the motor drive for the weight.

Figure 14:
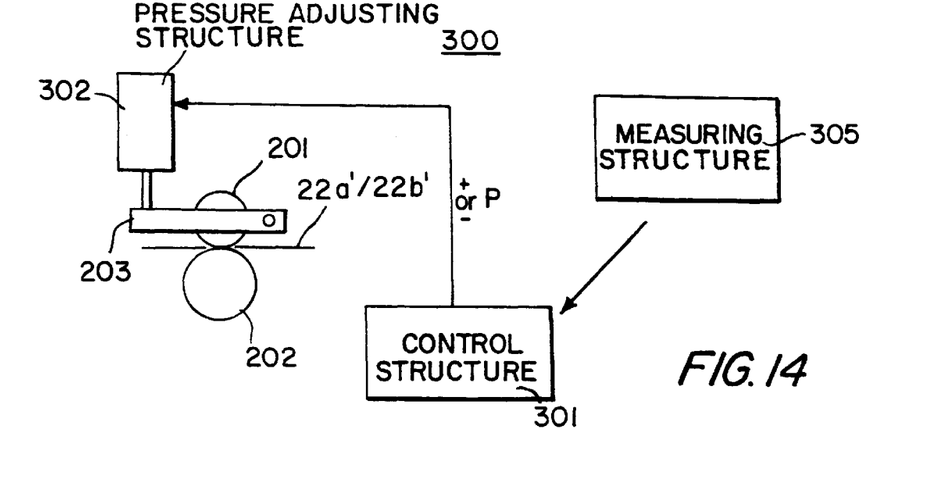
FIG. 14 is a simplified, partly schematic, elevational view of an alternative embodiment of the pressure device in FIG. 12 in accordance with certain aspects of the invention.

FIG. 14 shows an alternative embodiment of pressure device 200. Whereas pressure device 200 has weight 204 to adjust pressure P on a strip, pressure device 300 has a pressure adjusting structure or actuator 302 which can vary the pressure P on a strip. Actuator 302 can be any suitable actuator, such as a hydraulic or pneumatic cylinder. FIG. 14 shows actuator 302 as a pneumatic cylinder. After stator core 100' has been fabricated, it is placed in measuring station or structure 305 and the internal diameter 114 is measured (e.g., for each strip or more generally). This can be done with one or more probes. While FIG. 14 shows one pressure device 300, it is understood that there are preferably two pressure devices 300 used in apparatus of the type shown in FIGS. 1–8. More particularly with respect to one pressure device 300, the measured internal diameter 114 for the respective strip 22a' or 22b' is sent to the appropriate control unit or structure 301 which compares the measured internal diameter with the nominal internal diameter. Control unit 301 corrects for a difference in internal diameter by varying the pressure in actuator 302 by a certain amount. This adjustment will affect the strip material used in subsequent stator cores 100' fabricated from apparatus 10. Alternatively, internal diameter measuring structure 305 may measure internal diameter 114 more generally and the pressure devices 300 for both strips 22a' and 22b' may respond by making appropriate adjustments to the pressures P applied to both strips.

It will be understood that the foregoing is illustrative of further principles of the invention, and that various modifications can be made by those skilled in the art without departing from the scope and spirit of the invention. For example, although two pressure devices 200 or 300 are preferably used in apparatus 10, it will be understood that there could be only one pressure device used on only one of the strips. As an example of another modification, an additional active element could be used in conjunction with pressure device 300 to help the strip pass through pressure rollers 201 and 203.

Figure 15:
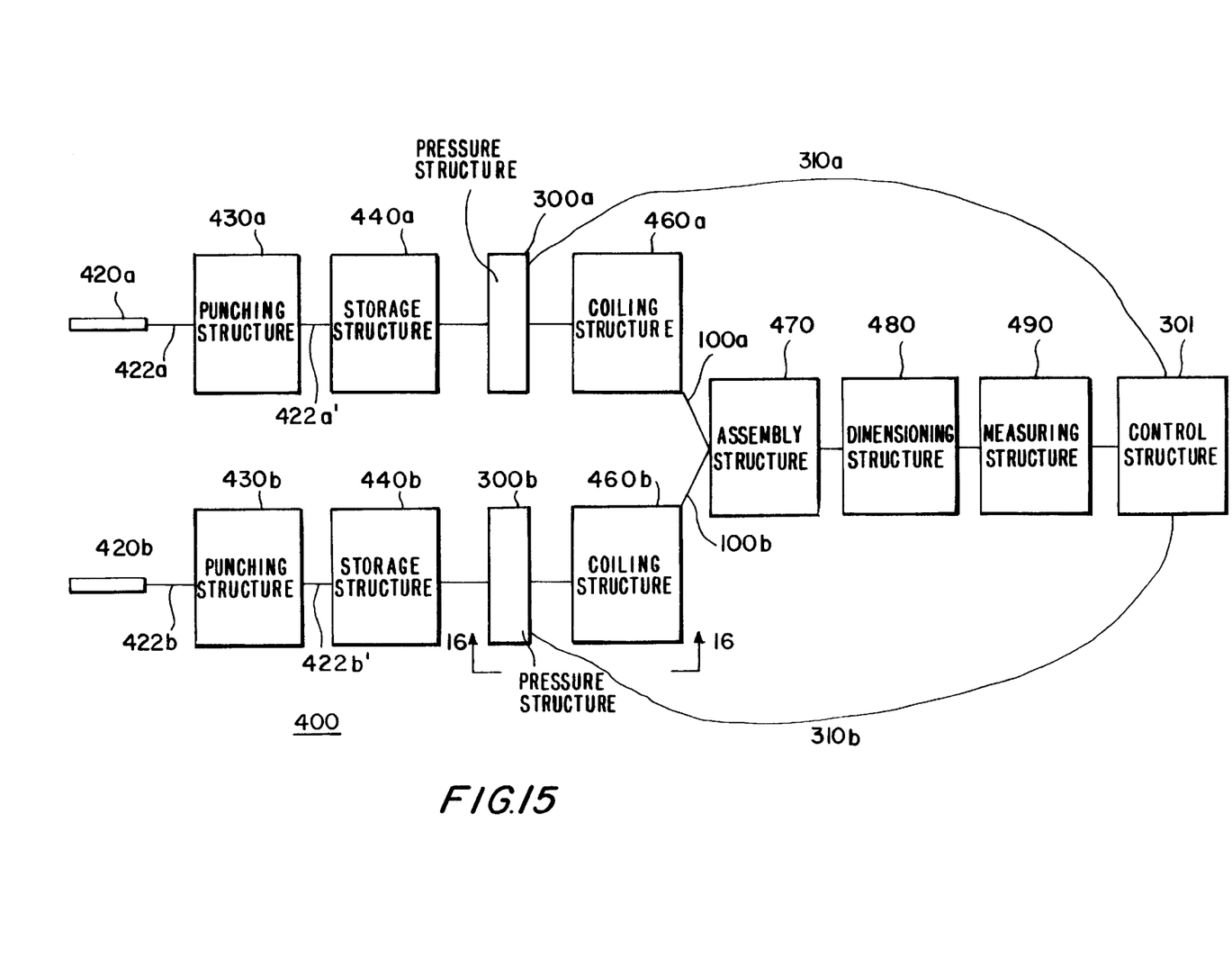
FIG. 15 is a simplified, largely schematic, plan view of another illustrative embodiment of apparatus constructed in accordance with certain aspects of the invention.

FIG. 15 shows a simplified plan view of an alternative embodiment of an apparatus for forming dynamo-electric machine stators. Apparatus 400 includes two reels 420a and 420b of strip material 422a and 422b, respectively. Strip material 422a and 422b may be thinner than the strip material typically used in the prior art. Strips 422a and 422b initially undergo the same processes through separate equipment. Therefore, the process will be described in detail for strip 422a, and it will be understood that strip 422b undergoes the same process.

Strip 422a is fed from reel 420a to punch 430a. Punch 430a performs the same function as punch 30. Strip 422a exits from punch 430a and is referenced as punched strip 422a'. Punched strip 422a' enters storage mechanism 440a which performs the same function as storage mechanism 40. Upon exiting storage mechanism 440a, strip 422a' enters pressure device 300a. Pressure device 300a compresses strip 422a' as described in the foregoing. Pressure device 300a selectively varies the pressure P applied to strip 422a' in response to control command 310a from control unit 301. Strip 422a' leaves pressure device 300a and enters coiling mechanism 460a.

Figures 16, 16A:
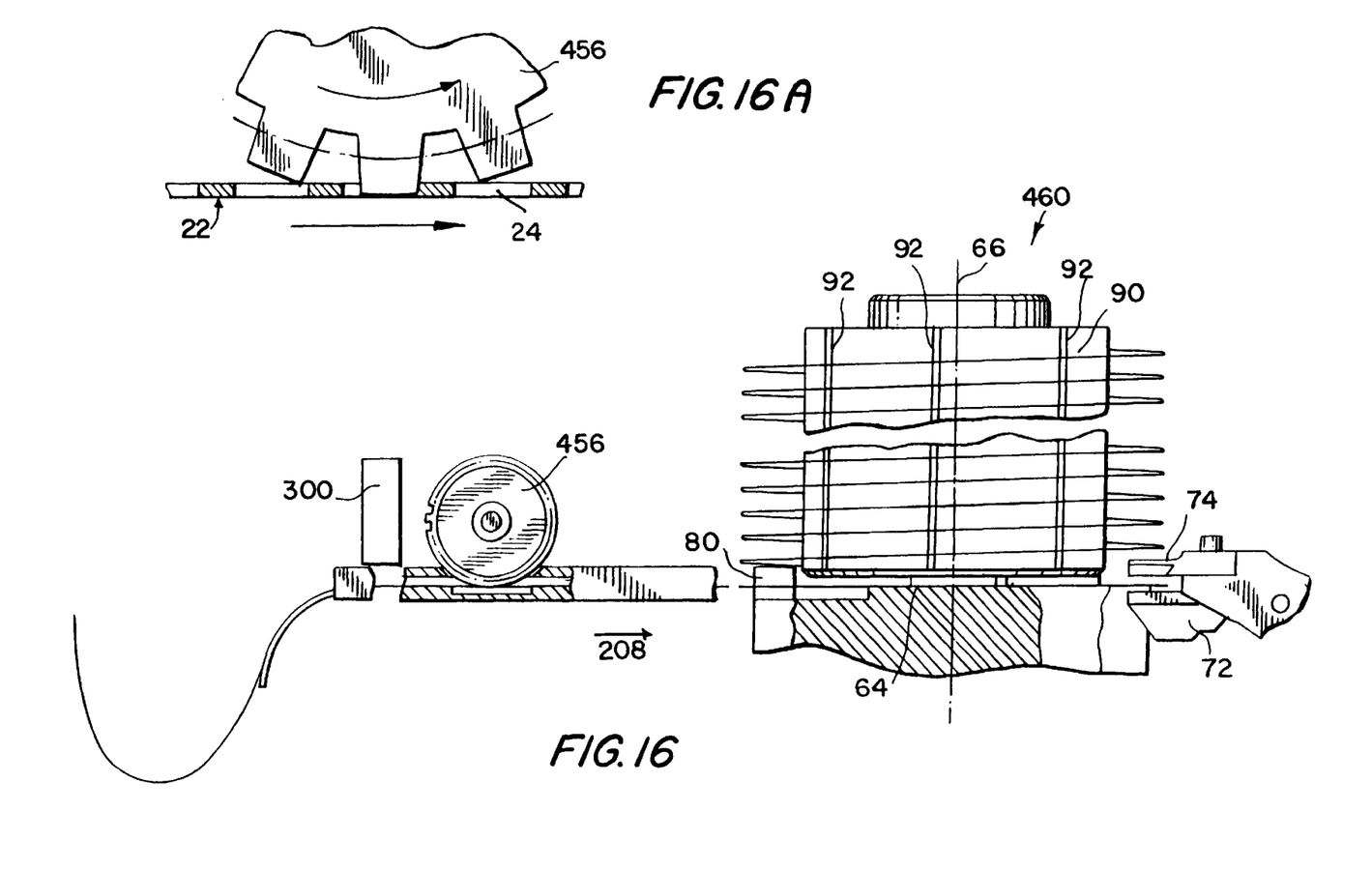
FIG. 16 is a more detailed elevational view, partly in section and partly schematic, taken generally along the line 16—16 in FIG. 15.
FIG. 16A is an enlargement, partly in section, of a portion of FIG. 16.

Pressure device 300a and coiling mechanism 460 are shown in more detail in FIG. 16. (The "a" suffix is not used on the reference numbers in FIG. 16.) Pressure device 300 is shown directly before spur gear 456. Spur gear 456 is configured to guide a single strip toward drum 90. With pressure device 300 in such close proximity to spur gear 456 and drum 90, an additional active element may not be necessary to help strip 422a' pass through pressure device 300. In reference to coiling mechanism 460, apart from spur gear 456 and the use of a single strip, coiling mechanism 460 performs the same processes as coiling mechanism 60. Therefore, it will be understood that both strips 422a' and 422b' are formed into helixes 100a and 100b, respectively, after processing from separate coiling mechanisms 460a and 460b.

Figure 17:
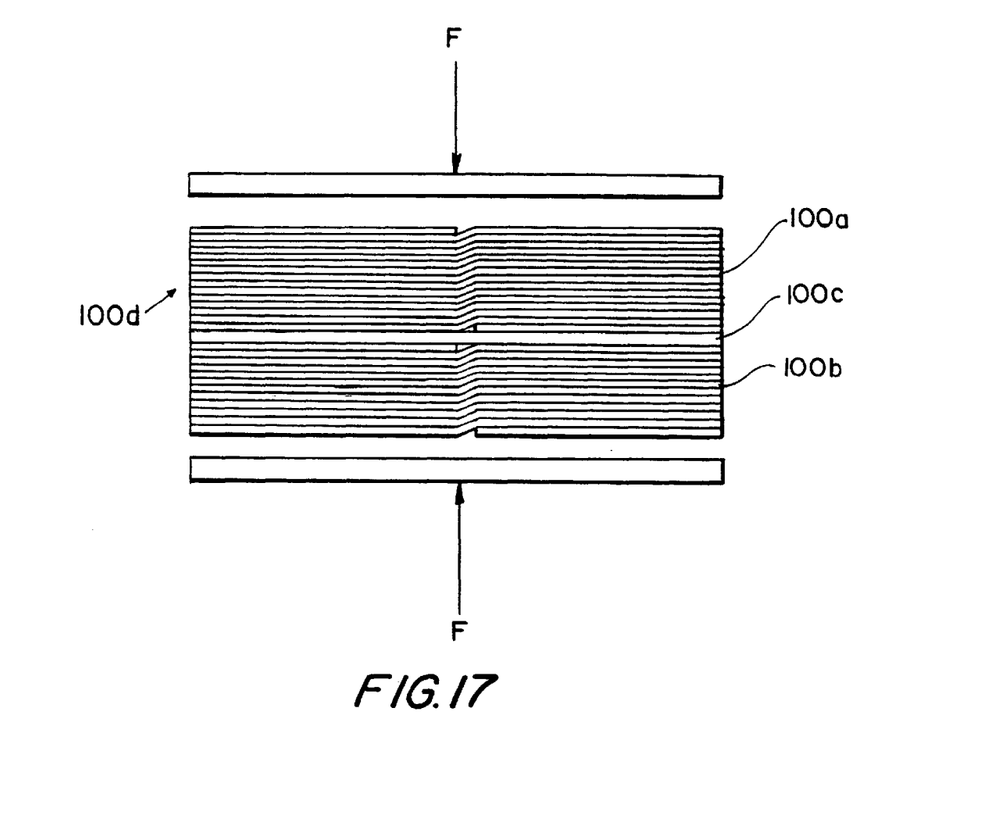
FIG. 17 is a simplified, partly schematic, elevational view of a portion of the FIG. 15 apparatus and an illustrative workpiece in that apparatus in accordance with other aspects of the invention.

Helixes 100a and 100b are subsequently placed into compression and welding station 470 where they are combined as shown in FIG. 17 by aligning their longitudinal axes and the their recesses 24. An additional layer or layers of hollow annular lamination 100c may be inserted between and combined with helixes 100a and 100b by aligning its longitudinal axis and recesses 24 with those of helixes 100a and 100b. In station 470 helixes 100a, 100b, and possibly the additional lamination 100c are consequently axially compressed by forces F, welded, and thereby converted to a rigid, unitary structure 100d. The welding can be performed along lines 102 shown in FIG. 10.

Subsequent to welding, stator core 100d may be processed in conventional dimensioning station or structure 480. Station 480 may include apparatus for applying force(s) to the inside and/or outside of stator core 100d to mechanically adjust various dimensional parameters of the core. For example, station 480 may force a substantially cylindrical member axially into the interior of the stator core 100d to ensure that the core is truly circular with the desired interior diameter 114. While dimensioning station 480 is able to correct for some deviation in the parameters of stator core 100d, excessive working of the material of stator core 100d in station 480 may not be desirable. For this and other reasons it may be desirable to use feedback to pressure devices 300 to reduce the amount of dimensional adjustments that must be made in station 480.

Stator core 100d is removed from device 480 and placed in measuring station 490. Measuring station 490 measures the internal diameter 114 of each of helixes 100a and 100b of stator core 100d. This may be done with one probe or with two probes, each entering from opposite ends of stator core 100d. The internal diameters 114 of helixes 100a and 100b are sent to control unit 301.

Control unit 301, with the measured internal diameters 114 and the nominal required internal diameter, determines the required adjustment to pressure devices 300a and 300b to correct for any deviation in the internal diameters 114. Control unit 301 then varies the pressure in actuator 302 by the determined adjustment. This adjustment will affect the strip material used in subsequent stator cores 100d.

It will be understood that the foregoing is illustrative of an alternative embodiment of the invention, and that various modifications can be made by those skilled in the art without departing from the scope and spirit of the invention. For example, while it is shown that helixes 100a and 100b are formed from separate pieces of equipment, it will be understood that there could be single puncher 430 or storage mechanism 440 configured to handle both strips. It may not be necessary to include all of the components of the alternative embodiment described herein. For example, storage mechanism 440 may not be necessary and punch 430 may not be if coils 420a and 420b are of prepunched strip material. As another example of modification within the scope of the invention, pressure device 200 may be used in place of pressure device 300. If pressure device 200 is used, then weight 204 can be manually adjusted without the need for a control unit or automatically adjusted with a motor drive connected to the control unit. Additionally, measuring station 490 may be used to determine the required adjustment to the pressure devices and control unit 301 would actuate the pressure devices. Alternatively, there could be two control units 301, one for each pressure device. As an example of another modification, only one pressure device may be used to match the internal diameters of the two helixes.

It will be appreciated that the pressure device aspects of the invention can also be used in apparatus for making a stator core from a single strip of material. For example, such apparatus could be as shown in FIG. 15, but without the elements having reference numbers having the "b" suffix, and with compression and welding device 470 and subsequent stations operating on only a single helix 100a.

Figure 18:
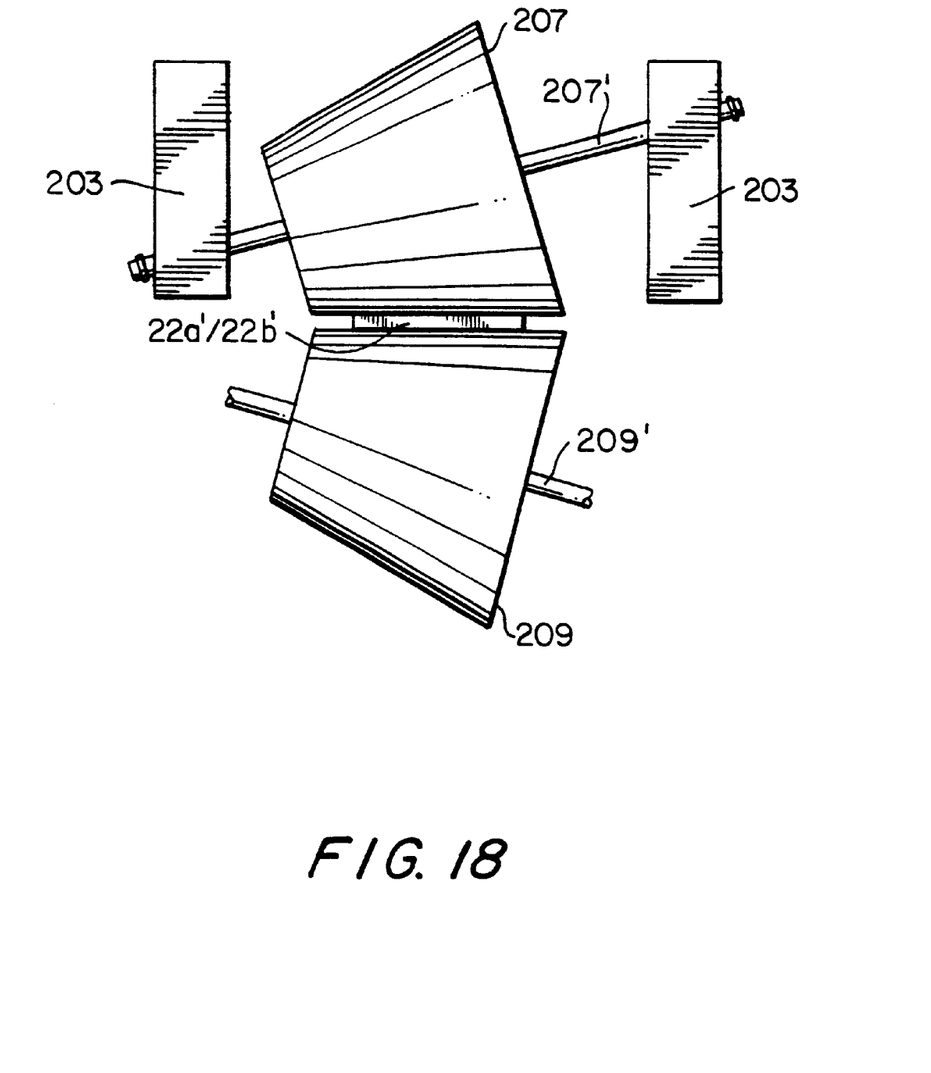
FIG. 18 is an elevational view, partly in section, taken generally along the line 18—18 in FIG. 13 of an alternate embodiment of the apparatus in FIG. 13.

An additional aspect of the invention includes using pressure rollers which are tapered in pressure devices 200 and 300 in place of cylindrical rollers 201 and 202. The tapered rollers are shown in FIG. 18 as top tapered roller 207 and bottom tapered roller 209. The tapered rollers are aligned such that the axial ends of the tapered rollers with the larger diameter are aligned symmetrical about the strip material and apply pressure to the edge of the strip which forms the external surface of the helical coil. Pressure rolling the strips with tapered rollers may help to further reduce the effects of local variations of the strip material on the performance of stator cores. When used with apparatus that has a coiling mechanism configured to coil a single strip, the pressure device with tapered rollers 207 and 209 may be located before rollers 62 and 64 of the coiling mechanism.

A pressure device with tapered rollers 207 and 209 can be used with apparatus 10 with super-position mechanism 50. The pressure device can be used on composite strip 22" at any place between super-position mechanism 50 and rollers 62 and 64 of coiling mechanism 60. This may be used in addition to or in place of pressure rolling device 200 or 300 with cylindrical rollers 201 and 202 which may be located on at least one strip 22a' or 22b'.

Figures 19, 20, 21:
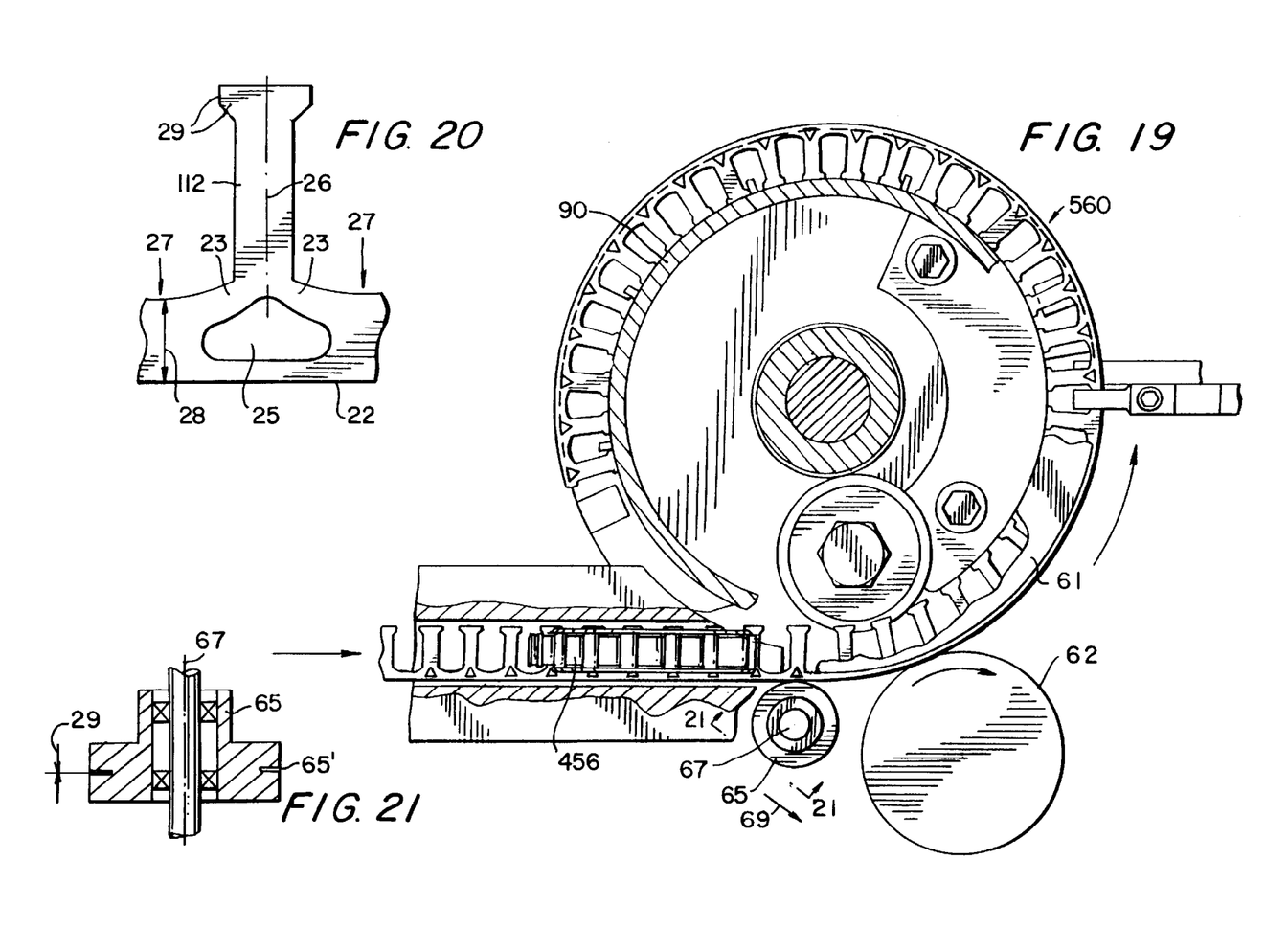
FIG. 19 is a plan view of an alternate illustrative embodiment of the apparatus in FIG. 8.
FIG. 20 is an enlargement, partly in section, of a portion of FIG. 18.
FIG. 21 is an elevational view taken generally along the line 21—21 in FIG. 19.

FIG. 19 shows a plan view of an additional alternative embodiment of an apparatus for helically coiling strip material to form dynamo-electric machine stators. FIG. 20 shows a detailed plan view of strip material 22 in FIG. 19. Strip material 22 contains pole extensions 112 centered on corresponding axes 26. Strip 22 has a thickness 29 and a width dimension 28. Dimension 28 has a great influence on the force required to bend strip 22 into a coil. The magnitude of dimension 28 relates positively to the force necessary to coil strip 22 and thus to the bending strength of strip 22. Unwanted deformation of strip 22 can occur when strip 22 is being bent into a coil if the strip's bending strength is large and thickness 29 is small. The bending of strip 22 causes the inside portion of strip 22 to undergo compression and the external portion of strip 22 to undergo tension. The compression of the internal edge may cause unwanted deformation in areas 27 of strip 22. The unwanted deformation can generally be considered buckling of strip 22 out of the plane shown in FIG. 20 due to the compression in areas 27. This unwanted deformation may occur as a series of creases in areas 27.

Strip 22 as shown in FIGS. 19 and 20 contains internal apertures 25. Apertures 25 are located at the base of pole extensions 112 and centered about axes 26. Apertures 25 reduce the occurrence of the unwanted deformation described in the foregoing. The form of apertures 25 are also such that solid areas 23 of strip 22 are left for the magnetic flow from operation as a dynamo-electric machine stator. This allows coiling mechanism or structure 560 to helically coil thinner strips of strip material 22 without unwanted deformation.

Another deformation which may occur in coiling relatively thin strips with a relatively large dimension 28 is undulation of strip 22 between spur gear 456 and drum 90. In order to help prevent strip 22 from undulating, spur gear 456 can be placed in close proximity to coiling mechanism 560 as shown in FIG. 19. This decreases the length of the strip which may deform between spur gear 456 and rollers 62 and 64. An additional modification which decreases the chance of undulation is to make casing 61, which guides strip 22 from rollers 62 and 64 to cutter 70, close-fitting to strip 22.

A final modification which can be made to coiling mechanism 560 to reduce undulation of strip 22 is the addition of roller 65. Roller 65 is located between spur gear 456 and rollers 62 and 64 and is free to rotate about axis 67. Roller 65 is shown in elevational view in FIG. 21. Roller 65 contains a groove 65' around its circumference with a V-shaped opening for containing the external edge of strip 22. In particular, roller 65 prevents unwanted deformation in direction 69 of strip 22.

The apertured strip 22 shown in FIGS. 19 and 20 can be alternatively described in the following terms: Strip 22 is a longitudinal strip of ferromagnetic metal for use in producing cores for the stators of dynamo-electric machines (e.g., electric motors, generators, alternators, or any other generally similar kinds of electrical equipment). Strip 22 has a plurality of apertures 25 through the material of the strip between the two major planar surfaces of the strip, the apertures being spaced from one another along the length of the strip. Apertures 25 are configured to deform to relieve stress in strip 22 when the strip is bent, transverse to its length and at least approximately in the plane in which the strip lies where it is bent, to produce the stator core. In the particular embodiments shown and described herein, the bending thus referred to is the bending between rollers 62 and 64 and around drum 90 which forms the strip into a multi-turn helix. Preferably, the stress relieved by apertures 25 reduces possible deformation of the strip perpendicular to the plane of the strip where it is bent as described above. Apertures 25 may relieve stress, for example, by changing shape and/or size.

Considering more particularly the features of the illustrative embodiment of strip 22 which is shown in FIGS. 19 and 20, strip 22 has a spine portion which extends continuously along a first side of the length of the strip, and a plurality of teeth 112 which extend transverse to the spine portion at respective locations which are spaced along the length of the spine portion. Apertures 25 are disposed in the spine portion. Most preferably, each aperture 25 is disposed adjacent the base of a respective one of teeth 112 where that tooth joins the spine portion of the strip. When strip 22 is bent into a multi-turn helix with the spine portion of the strip adjacent a radially outer surface of the helix and teeth 112 extending radially inward toward a central longitudinal axis of the helix, apertures 25 change size and/or shape (e.g., reduce in size) to relieve stress in the strip which might otherwise produce deformations of the strip perpendicular to its plane.

It is to be understood that the term "aperture" is used herein and in the appended claims to refer to an opening through strip 22 which is completely surrounded or bounded by material of the strip. An aperture 25 is therefore different from a recess (such as a recess 24) in the strip because a recess is only partly surrounded by the material of the strip and is therefore open on one side. The use of closed apertures 25 (as distinct from partly open recesses) to relieve stress in strip 22 is desirable for several reasons. Closed apertures 25 tend to reduce the amount of metal in strip 22 less than partly open recesses would. The presence of more metal tends to improve the electromagnetic performance of the finished stator. More metal also improves the heat-dissipating characteristics of the finished stator. Closed apertures 25 also give the finished stator a relatively smooth outer surface which is free of the undesirable discontinuities that would result from the use of partly open recesses.

Apertures 25 may be formed in strip 22 in any suitable way and with any suitable shapes, sizes, and locations. For example, the punching mechanisms 30/430 that may be provided for producing recesses 24 in strip 22 may also punch apertures 25 in the strip.

It will be understood that the foregoing is illustrative of an additional alternative embodiment of the invention, and that various modifications can be made by those skilled in the art without departing from the scope and spirit of the invention. For example, while coiling mechanism 560 is shown coiling a single strip of material, it will be understood that two or more strips may be coiled together as a composite strip. As another example of a modification, internal apertures 25 may be not be centered about axis 26. It may not be necessary to include all of the components and aspects of the this alternative embodiment. For example, internal apertures 25 may be sufficient alone to prevent unwanted deformations.

One skilled in the art will appreciate that the present invention can be practiced by other than the described embodiments, which are presented for purposes of illustration and not limitation, and the present invention is limited only by the claims which follow.

The invention claimed is:

1. Apparatus for forming a hollow cylindrical dynamo-electric machine stator core comprising:
   first and second sources of strip material;
   super-position structure configured to superimpose strip material from the first source on strip material from the second source to produce a composite strip;
   pressure rolling structure configured to apply pressure to the strip material from at least one of the first and second sources of strip material before the strip material reaches the super-position structure in order to modify an axial length dimension of the strip material; and
   coiling structure configured to helically coil the composite strip to produce the hollow cylindrical dynamo-electric machine stator core.

2. The apparatus defined in claim 1 further comprising:
   pressure adjusting structure configured to adjust the pressure applied by the pressure rolling structure.

3. The apparatus defined in claim 2 further comprising:
   control structure configured to control operation of the pressure adjusting structure in response to measurement of a dimension of the coil produced by the coiling structure.

4. The apparatus defined in claim 3 wherein the dimension is an internal diameter of the coil produced by the coiling structure, and wherein the apparatus further comprises:

measuring structure configured to measure the internal diameter of the coil produced by the coiling structure.

5. Apparatus for forming a hollow cylindrical dynamo-electric machine stator core comprising:

first and second sources of strip material;

super-position structure configured to superimpose strip material from the first source on strip material from the second source to produce a composite strip;

punching structure configured to punch the strip material from the first and second sources before the strip material reaches the super-position structure;

first pressure rolling structure configured to apply pressure to the strip material from the first source of strip material before that strip material reaches the super-position structure and after that strip material has left the punching structure in order to modify an axial length dimension of that strip material;

second pressure rolling structure configured to apply pressure to the strip material from the second source of strip material before that strip material reaches the super-position structure and after that strip material has left the punching structure in order to modify an axial length dimension of that second strip material; and coiling structure configured to helically coil the composite strip to produce the hollow cylindrical dynamo-electric machine stator core.

6. Apparatus for forming a hollow cylindrical dynamo-electric machine stator core comprising:

first and second sources of strip material;

pressure rolling structure configured to apply pressure to the strip material from the first source in order to modify an axial length dimension of that strip material;

first coiling structure configured to helically coil the strip material from the first source to produce a first helical coil;

second coiling structure configured to helically coil the strip material from the second source to produce a second helical coil; and assembly structure configured to assemble the first and second coils substantially coaxially with one another and axially spaced from one another by an annular lamination which is also substantially coaxial with the first and second coils, the assembly structure joining together the first and second coils and the annular lamination to produce the hollow cylindrical dynamo-electric machine stator core.

7. The apparatus defined in claim 6 wherein the pressure rolling structure is configured to further reduce variations in the strip material from the first source by passing the first strip between two tapered rollers.

8. The apparatus defined in claim 6 further comprising:

pressure adjusting structure configured to adjust the pressure applied by the pressure rolling structure.

9. The apparatus defined in claim 8 further comprising:

control structure configured to control operation of the pressure adjusting structure in response to measurement of a dimension of a coil previously produced by the first coiling structure.

10. The apparatus defined in claim 9 wherein the dimension is an internal diameter of the coil previously produced by the first coiling structure, and wherein the apparatus further comprises:

measuring structure configured to measure the internal diameter of the coil previously produced by the first coiling structure.

11. The apparatus defined in claim 6 further comprising:

second pressure rolling structure configured to apply pressure to the strip material from the second source in order to modify an axial length dimension of that second strip material.

12. The apparatus defined in claim 11 wherein the second pressure rolling structure is configured to further reduce variations in the strip material from the second source by passing the second strip between two tapered rollers.

\* \* \* \* \*